United States Patent [19]

Mulch

[11] 3,935,652
[45] Feb. 3, 1976

[54] CIRCULAR MAGAZINE FOR A SLIDE PROJECTOR

[75] Inventor: Hans Mulch, Wetzlar, Germany

[73] Assignee: Ernst Leitz G.m.b.H., Wetzlar, Germany

[22] Filed: June 26, 1974

[21] Appl. No.: 483,397

[30] Foreign Application Priority Data

July 7, 1973 Germany............................ 2334578

[52] U.S. Cl. .................................................. 40/78
[51] Int. Cl.² ....................................... B42F 17/00
[58] Field of Search ................ 40/74, 68.6, 78, 79; 353/116, 117; 206/73

[56] References Cited
UNITED STATES PATENTS

| 3,304,639 | 2/1967 | Wiklund | 40/68.6 X |
| 3,402,489 | 9/1968 | Schlessel | 40/68.6 X |

Primary Examiner—John H. Wolff
Attorney, Agent, or Firm—Gilbert L. Wells

[57] ABSTRACT

A circular magazine for a slide projector which is adapted to be molded in one piece. The magazine has a circular bottom wall (5) with an internal hub extending vertically therefrom defining an inside boundary wall (4). A plurality of slide compartment walls (2a) extend vertically from the bottom wall. At the upper right hand corner of each compartment wall a portion of the wall is elevated or expanded (6). Slides are held in position by the resilient pressure of the expanded portions (6) of corresponding compartment walls against the upper right hand corners of the slides and the lower left hand corners of the slides are seated against the L-shaped cross section of the bottom wall (5) and boundary wall (4). The legs of the bottom wall (5) and boundary wall (4) are foreshortened to lengths less than the linear dimensions of a slide so that a gripping device can extract the slides vertically to a projector or horizontally to the right into a projector.

7 Claims, 4 Drawing Figures

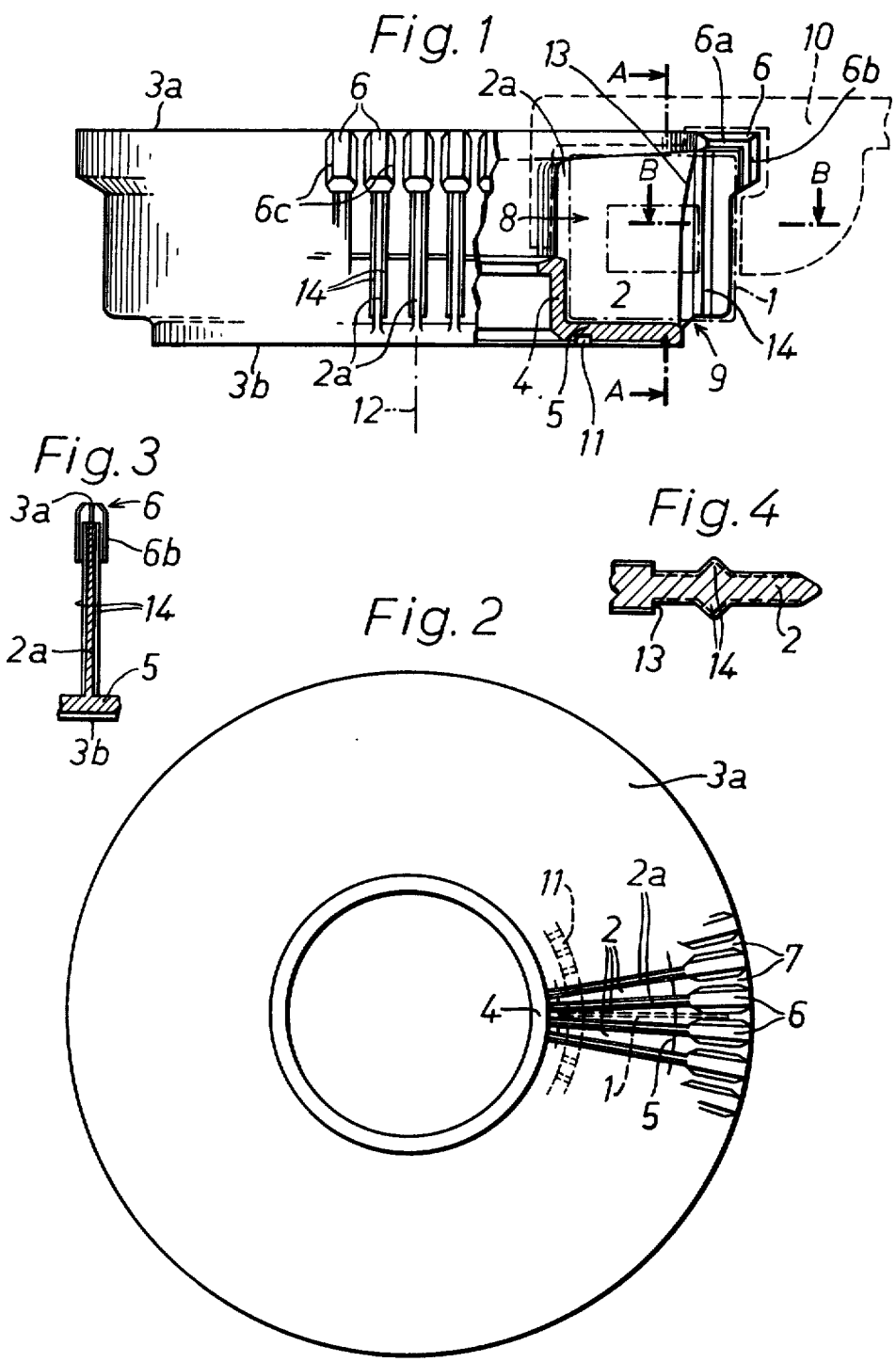

CIRCULAR MAGAZINE FOR A SLIDE PROJECTOR

CROSS-REFERENCES TO RELATED APPLICATIONS

Applicant claims priority under 35 U.S.C. 119 for application P 23 34 578.0 filed July 7, 1973 in the Patent Office of the Federal Republic of Germany.

The disclosure of assignee's copending application of Henkelmann, Ser. No. 418,257, filed Nov. 23, 1973 in the U.S. Patent Office is incorporated herein. The application of Henkelmann discloses, particularly in FIG. 8, the state of the art of drum magazines for slide projectors and the manipulation thereof.

BACKGROUND OF THE INVENTION

The field of the invention is magazines for slide projectors. The present invention is particularly related to a circular slide magazine having means for securely positioning slides in radial compartments. The slides are secured by bulges at the upper edges of the elastically designed individual slide compartment walls. Each pair of neighboring walls provides a compartment wherein the narrow sides of the compartment walls and the securing means thereon are the sides, and the cylindrical hub and bottom of the magazine are the left and bottom sides.

The state of the art of drum magazines for slide projectors may be ascertained by reference to U.S. Pat. application Ser. No. 418,257 and West German Pat. No. 1,098,236.

In prior art magazines, the slide compartment walls are provided with blocking cams at the edges in order to prevent undesired sideways exiting of the slides. However, these blocking cams do not simultaneously effect security with respect to the open, upper side of the L-shaped cross section magazine. Furthermore, the prior art magazine is of such design that the slides cannot be moved by a push rod or the like passing through the bottom of the magazine.

While the blocking cams may be made of one piece with the slide compartment walls, there is no suggestion that all of the body, consisting of bottom wall, side limiting wall and slide compartment walls are made of one piece. Technical difficulties would be expected in the manufacture of such a box-like, lengthwise slide magazine. Even more problems would be anticipated in preparation of a circular slide magazine, because in this instance, the feasibility of orientation relating to separation from a mold is appreciably reduced.

SUMMARY OF THE INVENTION

Having in mind the limitations of the prior art, it is an object of the present invention to provide a circular slide magazine of simple design and easy manufacture which allows for loading and removing the slides in two directions and permits access to individual slides during projection.

The object of the present invention is achieved for a circular slide magazine of the kind initially mentioned by having the effective parts of the securing means at the front and back sides inside the individual slide compartment not longer as a whole than the length of the side of the slide compartment and the securing means are mounted shifted with respect to each other so as not to intercept or overlap one another. The individual slide compartment walls and their upward extensions are made of one piece with the securing means or other limiting walls such as there might be, and the individual slide compartment walls are provided with mold separation steps or ledges for the purpose of molding in one piece. The securing means on one of the front or back sides may be formed from bulges at the upper right hand corner of the individual slide compartment walls. The mold separation steps representing connecting edges between the securing means at both front sides also function as accessories for the motion of slides over beveled ribs or fins that pass parallel or nearly so to the mold separation steps.

The bulges elevated at the upper right are formed so that a longitudinal slit is defined by two adjacent slide compartment walls. This slit is narrower than the thickness of the slide being used. The compartment walls may be provided with several elevated bulges acting independently of one another. However, it is advantageous that each slide compartment wall be designed with only one elevated bulge extending over part of the upper and outer edge. Such an elevated bulge then is L-shaped and beveled.

Furthermore, according to the present invention, the inside cylindrical boundary wall of the circular slide magazine and the bottom wall are of L-shape cross-section, there being shorter legs opposite the sideways length of the compartments. The bulges may be fastened either on the edge of the compartment walls opposite the inside cylindrical boundary wall, or on the front side opposite the bottom side. In order to prevent damage during slide motion, the bulges are mounted outside those regions swept through by the slide window during the latter's motion.

BRIEF DESCRIPTION OF THE DRAWING

Further details are disclosed by reference to the attached drawing showing one embodiment wherein:

FIG. 1 is a circular slide magazine in side view, partially in section;

FIG. 2 is the corresponding top view;

FIG. 3 is a cross sectional view along line A—A of FIG. 1; and

FIG. 4 is a cross sectional view along line B—B of FIG. 1, enlarged.

DESCRIPTION OF THE PREFERRED EMBODIMENTS

With particular reference to FIGS. 1 and 2, it is seen that slides 1 are housed in compartments 2 formed by the radially extending compartment walls 2a. The narrow sides of the compartments are defined by the boundary wall 4 located on the inside cylindrical surface or hub of the magazine, by the securing means on one of the front and back sides 3a, 3b (serving as bottom wall 5) and by securing means 6 of L-cross-section. The securing means 6 consist of compartment wall bulges extending over both: the edge opposite one of the boundary walls 4 and the top front side opposite the bottom wall. The components of securing means 6 are denoted by 6a and 6b. Bulging and beveled elevations 6c secure slide 1 against falling out of compartments 2. Every two adjacent bulges form a longitudinal slit 7 narrower than the thickness of the slides being shown.

Boundary wall 4 and bottom wall 5 are of L-shape cross-section where the legs are shorter than the horizontal and vertical lengths of the compartments and of the slides. Apertures 8, 9 for passage of the slide moving elements, as shown in dashed lines in FIG. 1, of a gripping device 10 are defined in this manner by the foreshortened legs.

A gear rim 11 is located in bottom wall 5, which allows rotating the magazine about its axis 12 by means of a pinion or the like (not shown).

The position and the length of securing means 5 and 6a are so selected as to be shifted with respect to each other and without intersecting one another. Together they do not exceed in length that of the side of the compartment. This design layout allows manufacturing all the boundary walls and securing means and also the compartment walls and bulges in one piece. This is possible because between the clear end edges of the securing means, i.e., the bottom wall 5 and part 6a of bulge 6, mold separation steps 13, as shown in FIG. 4, are provided on each compartment wall. It is possible that these steps might render slide motion more difficult. Therefore, the compartment walls 2a are equipped with additional fins or ribs 14 allowing smooth transition of the slides. Ribs 14 run parallel or nearly so to mold separation steps 13, and, depending on the steps being present on one or both sides of the compartment, are mounted in similar manner.

I claim:

1. A circular magazine for rectangular slides comprising an annular bottom wall (5) with a hub (4) defining a boundary wall rising from the inside diameter of said bottom wall, a plurality of compartment walls distributed uniformly and radially around said hub extending from said bottom wall and said hub, said compartment walls (2a) having lengths parallel and vertical to said bottom wall and corresponding substantially to the lengths of a rectangular slide, the compartment walls having securing means (6) diagonally opposite the intersection of said bottom wall and said hub, said securing means comprising bulges for precluding accidental ejection of the slides and defining slits (7) between each neighbored compartment wall, said slits being narrower than the thickness of a slide being used, said hub being of low height compared to the vertical length of the compartment walls, said hub, said bottom wall and said securing means matingly receiving rectangular slides lying with one edge on said bottom wall and between said compartment walls, said securing means and said bottom wall having a combined length less than said parallel length of the compartment walls and being disposed to each other without overlapping.

2. The circular magazine of claim 1, wherein said securing means are located L-shaped with one leg parallel to the bottom wall and one leg parallel to the hub.

3. The circular magazine of claim 2, wherein the bulges are provided with bevels.

4. The circular magazine of claim 3, wherein said bulges are located in a region of said compartment walls where they do not cover film openings of slides being transported into and out of the magazine.

5. A circular magazine for rectangular slides comprising an annular bottom wall (5) with a hub (4) defining a boundary wall rising from the inside diameter of said bottom wall, a plurality of compartment walls distributed uniformly and radially around said hub extending from said bottom wall and said hub, said compartment walls (2a) having lengths parallel and vertical to said bottom wall and corresponding substantially to the lengths of a rectangular slide, the compartment walls having securing means (6) diagonally opposite the intersection of said bottom wall and said hub, said securing means comprising bulges for precluding accidental ejection of the slides and defining slits (7) between each neighbored compartment wall, said slits being narrower than the thickness of a slide being used, said hub being of low height compared to the vertical length of the compartment walls, said hub, said bottom wall and said securing means matingly receiving rectangular slides lying with one edge on said bottom wall and between said compartment walls, said securing means and said bottom wall having a combined length less than said parallel length of the compartment walls and being disposed to each other without overlapping, and each of said compartment walls being further provided on both sides with mold separation steps extending from the outer diameter of said bottom wall to the inner diameter of said securing means whereby all parts of the magazine, including the annular bottom wall, the hub and the compartment walls with their securing means adapted to be molded in one piece.

6. The circular magazine of claim 5, wherein all parts are formed of resilient material permitting lateral expanding of the compartment walls.

7. The circular magazine of claim 5, wherein ribs (14) with starting bevels are provided for the mold separation steps (13), said ribs running substantially parallel to said steps, for assisting the motion of slides (1) over said steps.

* * * * *